(12) United States Patent  
So

(10) Patent No.: US 8,944,930 B2  
(45) Date of Patent: Feb. 3, 2015

(54) GOLF EYEGLASSES HAVING FUNCTION OF CORRECTING VARIOUS SWING ERRORS AND HEAD UP MOVEMENT

(75) Inventor: Il Sop So, Incheon (KR)

(73) Assignees: Il Sop So, Incheon (KR); Dae Sik Kim, Incheon (KR)

( * ) Notice: Subject to any disclaimer, the term of this patent is extended or adjusted under 35 U.S.C. 154(b) by 0 days.

(21) Appl. No.: 13/982,372

(22) PCT Filed: Aug. 9, 2012

(86) PCT No.: PCT/KR2012/006358  
§ 371 (c)(1),  
(2), (4) Date: Jul. 29, 2013

(87) PCT Pub. No.: WO2013/035985  
PCT Pub. Date: Mar. 14, 2013

(65) Prior Publication Data  
US 2014/0179453 A1    Jun. 26, 2014

(30) Foreign Application Priority Data  
Sep. 7, 2011    (KR) .......................... 10-2011-0090838

(51) Int. Cl.  
A63B 69/36    (2006.01)

(52) U.S. Cl.  
CPC .............. *A63B 69/3608* (2013.01); *A63B 69/36* (2013.01)  
USPC .......................................... 473/209; 473/210

(58) Field of Classification Search  
USPC ............ 473/207–211, 266, 268, 274; 351/41, 351/45, 57, 118, 158  
See application file for complete search history.

(56) References Cited

U.S. PATENT DOCUMENTS

| | | | | |
|---|---|---|---|---|
| 4,097,141 A | * | 6/1978 | Warner | 359/364 |
| 4,852,882 A | * | 8/1989 | Otsuka et al. | 473/210 |
| 5,291,229 A | * | 3/1994 | Feinbloom | 351/57 |
| 6,224,492 B1 | * | 5/2001 | Grimes | 473/210 |
| 6,390,823 B1 | * | 5/2002 | Wesenhagen | 434/252 |
| 8,157,663 B1 | * | 4/2012 | Winkelsas et al. | 473/210 |

FOREIGN PATENT DOCUMENTS

| | | |
|---|---|---|
| JP | 05-063575 | 8/1993 |
| JP | 2005-125103 | 5/2005 |
| KR | 20-1975-0000634 | 7/1975 |
| KR | 20-2008-0003938 | 9/2008 |
| WO | 02-076557 | 10/2002 |

* cited by examiner

*Primary Examiner* — Nini Legesse  
(74) *Attorney, Agent, or Firm* — Kile Park Reed & Houtteman PLLC

(57) ABSTRACT

Provided is a pair of golf eyeglasses having a function of correcting various swing errors and head-up movement, in which a golf ball-colored focus structure is detachably mounted on one of a pair of eyeglasses, to thus form a golf ball-colored focus control circle with a limited field of view, in order to correct errors in various swing actions that frequently occur for golfers. In addition, the pair of golf eyeglasses enables a golfer to make a golf swing practice by using a limited field of view of a golf ball-colored adjustable focus circle, to thereby make the golfer focus more attention on a target golf ball, and recognize various swing errors and the head up movement for himself or herself as soon as the golf ball deviates from the golf ball-colored adjustable focus circle and correct the posture of the golfer, and to thus allow anyone from amateur golfers to professional golfers to conveniently use the golf eyeglasses at low costs.

7 Claims, 7 Drawing Sheets

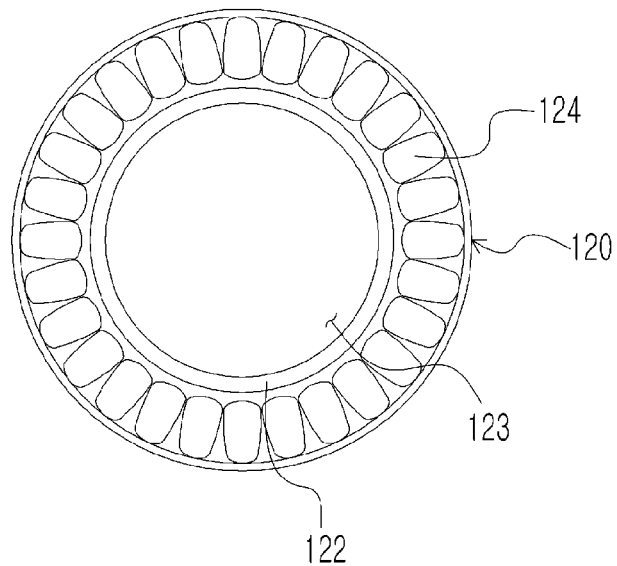
FIG. 5
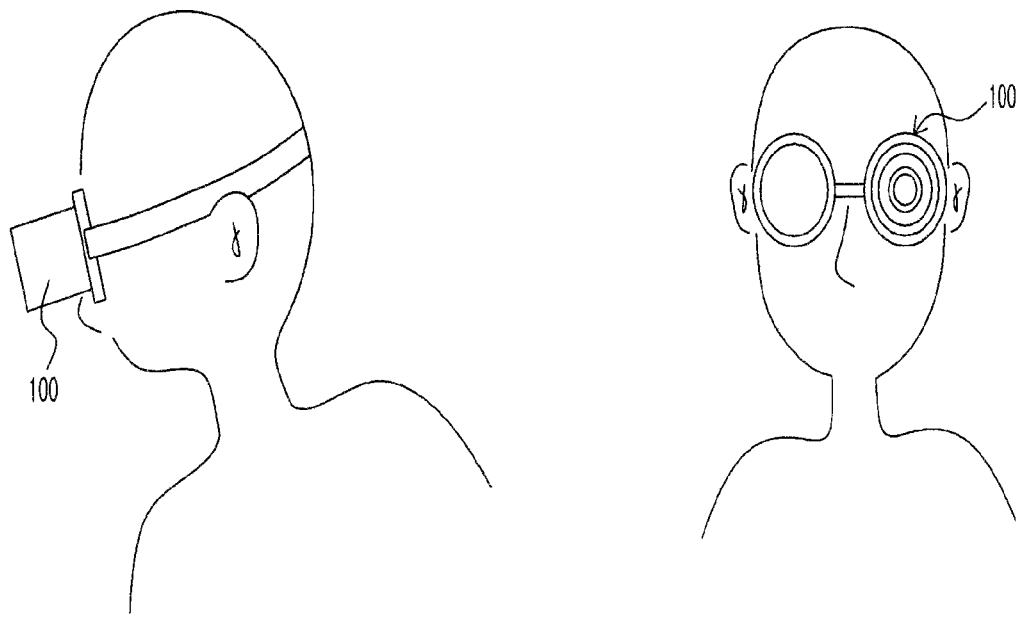
FIG. 6A   FIG. 6B

GOLF EYEGLASSES HAVING FUNCTION OF CORRECTING VARIOUS SWING ERRORS AND HEAD UP MOVEMENT

TECHNICAL FIELD

The present invention relates to a pair of golf eyeglasses, and more specifically to, a pair of golf eyeglasses having a function of correcting various swing errors and head-up movement, in which a golf ball-coloured focus structure is detachably mounted on at least one of left and right eyeglasses, to thus make a golf swing practice by using a golf ball-coloured focus control circle that is formed by the golf ball-coloured focal structure, and to thereby allow a golf ball to be viewed clearly in the pupils from the start of a swinging action at an initial address posture to a completion of a finish action, in order to minimize errors in various swing actions.

BACKGROUND ART

Golf is sports that especially emphasizes the correct posture when compared with other sports. In golf, one of the most basic operations is to make a swing action while pivoting in place on a backswing. This swing action depends on how much the golf swing remains consistent. No matter how much repetitive practice is performed, if the eyes deviate from the ball and the head being the central point moves down and up, and from left to right, it will be difficult for even a professional golfer to maintain consistency.

Therefore, if the eyes move back, the head moves up, down, left or right, or the body itself moves, at the time of the backswing, various swing errors occur. In this case, golfers may make a golf swing action while directly confirming his or her various swing errors with his or her own eyes for himself or herself, in order to minimize swing errors and keep consistency. In addition, a preferred solution is if the basic swing error of keeping the head up at the moment of impact is confirmed with his or her eyes during practice.

The field of view of a person is relatively wide and thus the ball is visible even if the head turns to a degree. Therefore, most golfers tend to turn the eyes or the head from the backswing before hitting the ball, and thus the axis of the swing posture is easily distracted, to thereby cause a problem that the ball cannot be exactly hit. In other words, those who have two eyes have two focuses. The golfer stares at a target golf ball, but he or she does not know the fact that he or she is moving. In this case, unless golf swing actions are captured by a video camera and are comparatively analyzed, even a golf coach cannot accurately predict the golfer's eyes to move back and forth or up and down. As a result, a phenomenon that the central point of the head moves up and down and left and right or the head-up movement occurs in advance may be corrected by using video equipment.

Swing errors such as phenomena that the eyes deviate from a target ball, the neck is kept up or down, the neck moves or the body moves or the head is kept up in advance before impact during the backswing, may occur most frequently for golfers. Consistency in playing golf cannot be maintained without correcting such swing errors and so it will be difficult to improve skill level.

In addition, the eyes of a golfer act like the brain. That is, the eyes are connected to the nerves and the muscles through the brain.

Therefore, in the case that the golf ball is clearly vivid in the pupils, the nerves and the muscles of the golfer will be prepared to move in advance.

DISCLOSURE

Technical Problem

To solve the above conventional problems or defects, it is an object of the present invention to provide a pair of golf eyeglasses having a function of correcting various swing-errors and head-up movement, in which a golf ball-coloured focus structure is detachably mounted on one of eyeglasses, to thus form a golf ball-coloured focus control circle with a limited field of view, in order to correct errors in various swing actions that frequently occur for golfers.

It is another object of the present invention to provide a pair of golf eyeglasses having a function of correcting various swing errors and head-up movement, which enables a golfer to make a golf swing practice by using a limited field of view of a golf ball-coloured focus control circle, to thereby make the golfer focus more attention on a target golf ball, and recognize various swing errors and the head up movement for himself or herself at the moment the golf ball is released from the golf ball-coloured focus control circle and correct the posture of the golfer, and to thus allow anyone to make a convenient use of the golf eyeglasses at low costs from beginners to pro-golfers.

Technical Solution

To accomplish the above and other objects of the present invention, according to an aspect of the present invention, there is provided a pair of golf eyeglasses having a function of correcting various swing errors and head-up movement, the golf eyeglasses comprising: a golf ball-coloured focus structure that is mounted on at least one of left and right eyeglasses in a frame of the eyeglasses, and that forms a golf ball-coloured focus control circle so as to make a golfer recognize the various swing errors and head-up movement that are caused by unstable posture occurring according to movement of the head, the eyes and the body of the golfer who makes a golf swing practice, wherein the golf ball-coloured focus structure comprises: a structure housing having a hollow outer chamber whose front and rear ends are opened, and a hollow inner chamber that is mounted in the inside of the outer chamber, and a focus control lens body that is detachably fitted on the front end of the structure housing.

Preferably but not necessarily, the golf focus color structure is configured to rotate in the range of 360° at a portion connected with the frame of the eyeglasses.

Preferably but not necessarily, the golf focus color structure further comprises an eyeglass connector that is detachably connected with a connection member that is formed on any one of the left and right eyeglasses in the frame of the eyeglasses, and wherein a dual lens including a lens, and a blind lens that covers the lens and may be opened and closed is provided at any one of the left and right eyeglasses in the frame of the eyeglasses with which the golf focus color structure is not connected.

Preferably but not necessarily, the eyeglass connector is prepared to employ any one of an adhesive Velcro® fastening method, a screw fastening method, and an interference fit method, in correspondence to a connection member of the frame of the eyeglasses.

Preferably but not necessarily, the structure housing is configured so that the inner chamber that is mounted in the inside of the outer chamber is withdrawn toward the front side, and wherein the focus control lens body is linked at a state of being connected with the inner chamber according to the frontward withdrawal of the inner chamber and is thus withdrawn toward the front side.

Preferably but not necessarily, the focus control lens body comprises: a lens body housing having a structure connector that is detachably connected on the front end of the structure housing; and a focus control lens that is mounted on the front end of the lens body housing to thus form the golf ball-coloured focus control circle, and wherein the focus control lens comprises a multi-colored lens having one or more colors toward a radial edge from the center of the diameter the lens.

Preferably but not necessarily, the focus control lens body is formed to have one of a circular shape, an oval shape, and an angularly polygonal shape, in correspondence to that of the structure housing, and wherein the focus control lens is formed in shape in correspondence to that of the focus control lens body.

Preferably but not necessarily, the focus control lens is formed of a lens of an aperture system that can control the amount of light and that is detached from and attached to the focus control lens body.

Preferably but not necessarily, the focus control lens body further comprises a light emitting diode (LED) light source that emits light to the outer diameter along which the focus control lens is formed.

Advantageous Effects

According to a pair of golf eyeglasses having a function of correcting various swing errors and head-up movement, which is proposed in the present invention, a golf ball-coloured focus structure is detachably mounted on one of eyeglasses, to thus form a golf ball-coloured focus control circle with a limited field of view, in order to correct errors in various swing actions that frequently occur for golfers.

In addition, according to the present invention, the pair of golf eyeglasses enables a golfer to make a golf swing practice by using a limited field of view of a golf ball-coloured focus control circle, to thereby make the golfer focus more attention on a target golf ball, and recognize various swing errors and the head up movement for himself or herself at the moment the golf ball deviates from the golf ball-coloured focus control circle and correct the posture of the golfer, and to thus allow anyone from amateur golfers to professional golfers to conveniently use the golf eyeglasses at low costs.

DESCRIPTION OF DRAWINGS

FIG. 5 is a diagram showing another example of the focus control lens body in a pair of golf eyeglasses having a function of correcting various swing errors and head-up movement, according to an embodiment of the present invention.

FIGS. 6A and 6B are views illustrating the states of wearing a pair of golf eyeglasses having a function of correcting various swing errors and head-up movement, according to an embodiment of the present invention.

BEST MODE

Hereinafter, a pair of golf eyeglasses having a function of correcting various swing errors and head-up movement, according to a preferred embodiment of the present invention will be described in detail with reference to the accompanying drawings, so that one who has an ordinary skill in the art can easily implement the present invention. In the description of the present invention, if it is determined that a detailed description of commonly-used technologies or structures related to the invention may unnecessarily or unintentionally obscure the subject matter of the invention, the detailed description will be omitted. Like numbers refer to like elements throughout the description of the figures.

It will be understood that when an element is referred to as being "connected" or "coupled" to another element, it can be directly connected or coupled to the other element or intervening elements may be present, that is, an element is "indirectly connected" or "indirectly coupled" to another element. It will be further understood that the terms "comprises," "comprising," "includes" and/or "including", when used herein, unless otherwise specified, do not preclude other elements but contain other elements.

Figure 1:
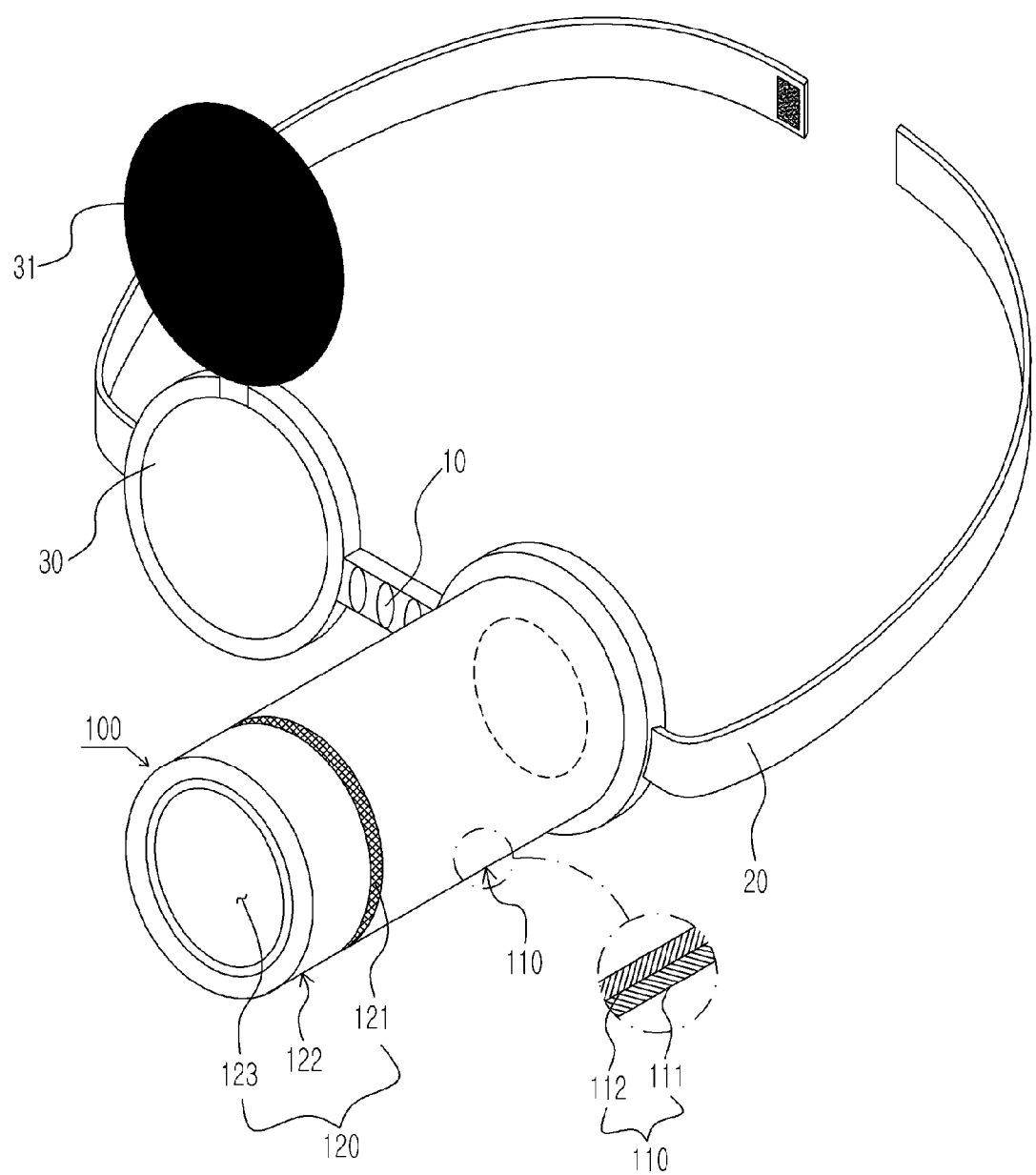
FIG. 1 is a perspective view illustrating a pair of golf eyeglasses having a function of correcting various swing errors and head-up movement, according to an embodiment of the present invention.

FIG. 1 is a perspective view illustrating a pair of golf eyeglasses having a function of correcting various swing errors and head-up movement, according to an embodiment of the present invention. As shown in FIG. 1, a pair of golf eyeglasses having a function of correcting various swing errors and head-up movement, according to an embodiment of the present invention includes a golf ball-coloured focus structure 100 that is mounted on at least one of left and right eyeglasses in a frame 10 of the eyeglasses. The golf ball-coloured focus structure 100 may include a structure housing 110 and a focus control lens body 120.

The golf ball-coloured focus structure 100 is mounted on at least one of left and right eyeglasses in a frame 10 of the eyeglasses, and forms a golf ball-coloured focus control circle 40 (see FIGS. 7A to 7C) so as to make a golfer recognize the various swing errors and head-up movement that are caused by unstable posture occurring according to movement of the head, the eyes and the body of the golfer who makes a golf swing practice. In this case, a dual lens including a lens 30 and a blind lens 31 that covers the lens 30 and may be opened and closed is provided at any one of the left and right eyeglasses in the frame 10 of the eyeglasses with which the golf focus color structure 100 is not connected.

Here, the lens 30 means normal eyeglasses that are adjusted to the power of user's eyes, and the blind lens 31 is a black lens (an opaque lens) to hide one of the user's eyes, in the golf eyeglasses having a function of correcting various swing errors and head-up movement, according to an embodiment of the present invention. The golf eyeglasses having a function of correcting various swing errors and head-up movement, according to an embodiment of the present invention include temples 10 that can be worn by a user. The temples 10 in the present invention have structures that are employed in the normal glasses. Besides, rubber bands considering an aesthetic sense in view of a design, band-shaped straps attached with Velcro®, etc., may be employed as the temples in various examples. The golf ball-coloured focus structure 100 that is applied to the golf eyeglasses having a function of correcting various swing errors and head-up movement, according to an embodiment of the present invention is configured to rotate in the range of 360° at a state of being mounted in the frame 10 of the eyeglasses. In other words, a connection portion of the frame 10 of the eyeglasses that is combined with the golf ball-coloured focus structure 100 is configured to be rotatable. Rotation of the frame 10 of the eyeglasses may allow a target golf ball to be fixed in the center of the golf ball-coloured focus control circle 40, even if a golfer does not move his or her neck or head.

The golf eyeglasses having a function of correcting various swing errors and head-up movement, according to an embodiment of the present invention, allows users to make a golf swing practice while gazing at a target golf ball with a limited field of view through the golf ball-coloured focus control circle 40 of the golf ball-colored focus structure 100, at a state where one of eyes of each user is covered, during making a golf swing practice, to thereby assist each user to recognize whether a change in the eyes or head-up movement occurs for himself or herself at a time of making a golf swing practice, and correct golf swing errors.

Figure 2A:
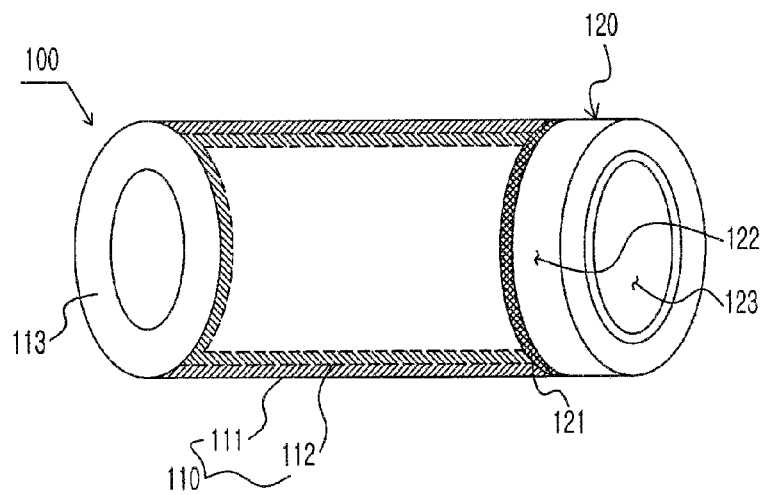
FIGS. 2A to 2C are perspective views illustrating examples of a golf ball-coloured focus structure in a pair of golf eyeglasses having a function of correcting various swing errors and head-up movement, according to an embodiment of the present invention.
Figure 2B:
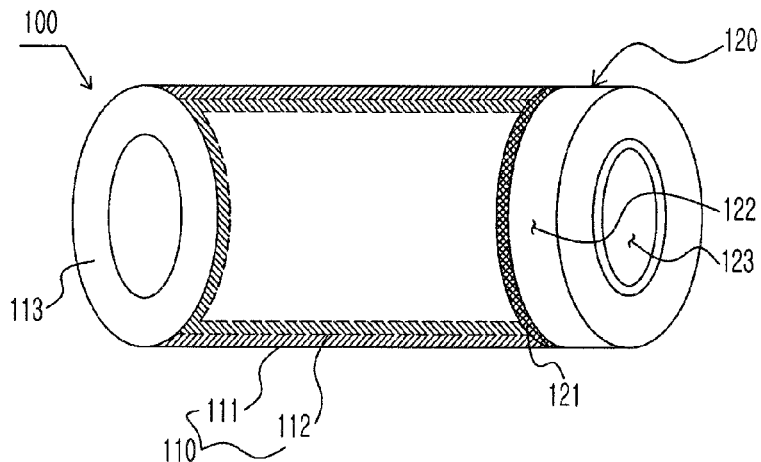
Figure 2C:
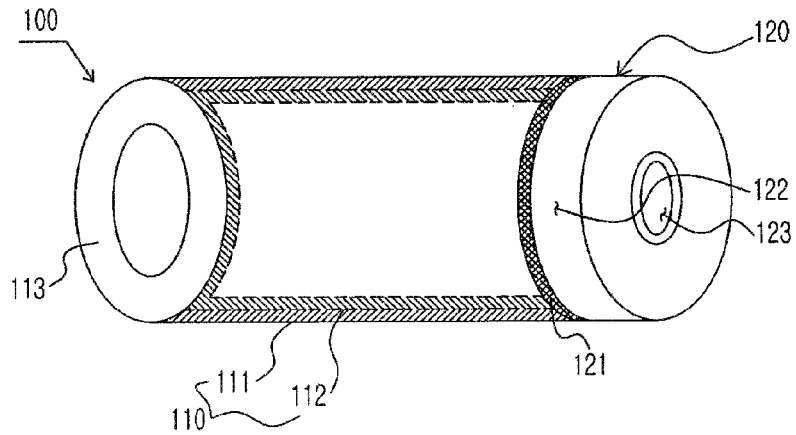

FIGS. 2A to 2C are perspective views illustrating examples of a golf ball-coloured focus structure in a pair of golf eyeglasses having a function of correcting various swing errors and head-up movement, according to an embodiment of the present invention.

As shown in FIGS. 2A to 2C, the golf ball-coloured focus structure 100 connected with the pair of golf eyeglasses having a function of correcting various swing errors and head-up movement, according to an embodiment of the present invention, includes a structure housing 110 and a focus control lens body 120, and further includes lenses for eyeglasses (not shown).

The structure housing 110 has a hollow outer chamber 111 whose front and rear ends are opened, and a hollow inner chamber 112 that is mounted in the inside of the outer chamber 111. An eyeglass connector 113 that is detachably connected with a connection member (not shown) that is formed on any one of the left and right eyeglasses in the frame 10 of the eyeglasses, is further included at one end of the outer chamber 111. The eyeglass connector 113 is prepared to employ any one of an adhesive Velcro® fastening method, a screw fastening method, and an interference fit method, in correspondence to a connection member of the frame 10 of the eyeglasses. The structure housing 110 is configured so that the inner chamber 112 that is mounted in the inside of the outer chamber 111 is withdrawn toward the front side, and the focus control lens body 120 is linked at a state of being connected with the inner chamber 112 according to the frontward withdrawal of the inner chamber 111 and is thus withdrawn toward the front side.

Here, the change in the withdrawal length of the inner chamber 112 may play a role of a zooming function of a pair of golf eyeglasses, and the structure of the various shapes of the inner chamber 112 is distinguished and used depending on golfer's swing levels and methods. The golf ball-coloured focus structure 100 shown in FIG. 2A may be used in a driver for a novice, the golf ball-coloured focus structure 100 shown in FIG. 2B may be used in a short middle iron for an intermediate golfer, and the golf ball-coloured focus structure 100 shown in FIG. 2C may be used in a putting and short game for a professional golfer.

The focus control lens body 120 may include: a lens body housing 122 having a structure connector 121 that is detachably connected on the front end of the structure housing 110; and a focus control lens 123 that is mounted on the front end of the lens body housing 122 to thus form the golf ball-coloured focus control circle 40. The focus control lens 123 may include a multi-colored lens having one or more colors toward a radial edge from the center of the diameter the lens. The structure connector 121 may be prepared to employ any one of a screw fastening method and an interference fit method, in correspondence to a connection member (not shown) that is formed in the front end of the structure housing 110. The focus control lens 123 including the multi-colored lens may employ colors that are the brightest and the most stable for eyes. The focus control lens 123 that forms the golf ball-coloured focus control circle 40 in the golf ball-coloured focus structure 100 that assists a target golf ball to be positioned at the circular center may be made of a fluorescent material or luminous material in a color lens of a radial edge except for a transparent diameter center circle. In addition, the focus control lens 123 may be configured to have a glass-formed plastic material that reflects light, an aluminum material that reflects light, or a high brightness reflection sheet.

Figure 3A:
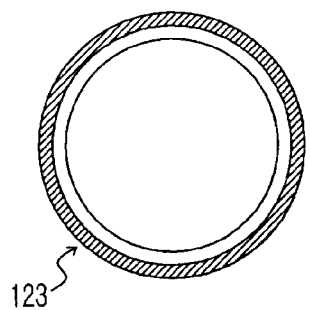
FIGS. 3A to 3D are front views showing a configuration of a focus control lens in a pair of golf eyeglasses having a function of correcting various swing errors and head-up movement, according to an embodiment of the present invention.
Figure 3B:
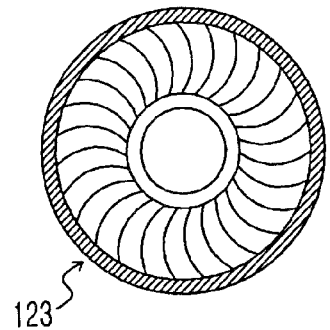
Figure 3C:
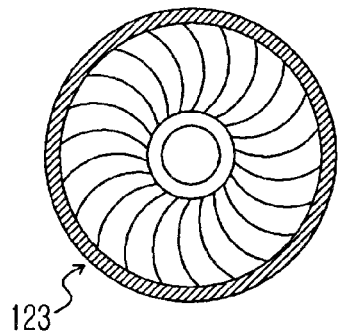
Figure 3D:
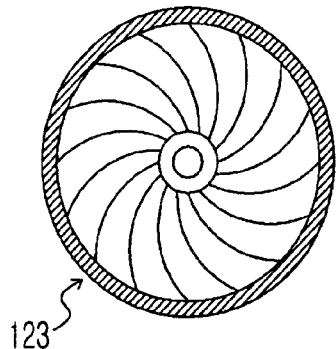
Figure 4A:
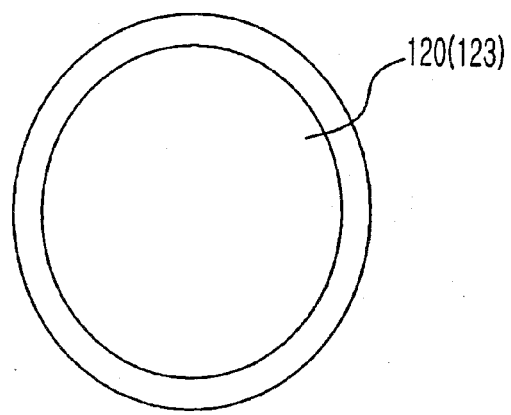
FIGS. 4A to 4E are diagrams showing the shapes of a focus control lens body in a pair of golf eyeglasses having a function of correcting various swing errors and head-up movement, according to an embodiment of the present invention.
Figure 4B:
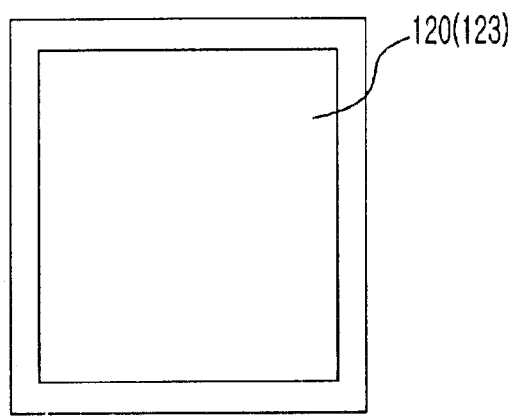
Figure 4C:
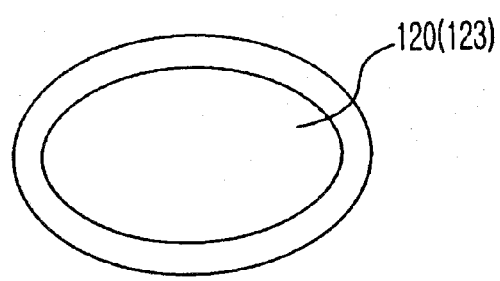
Figure 4D:
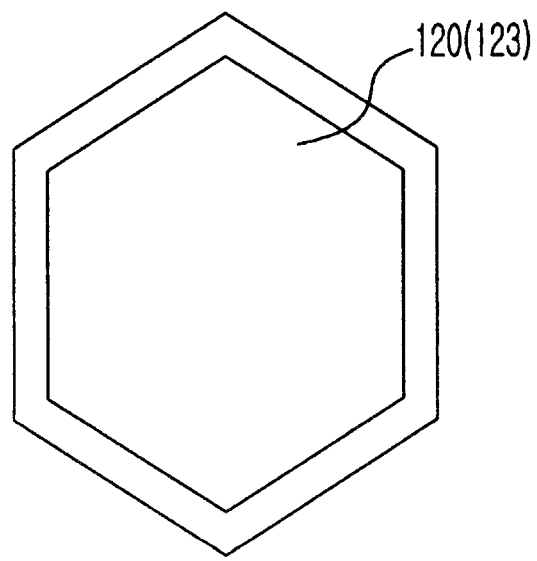
Figure 4E:
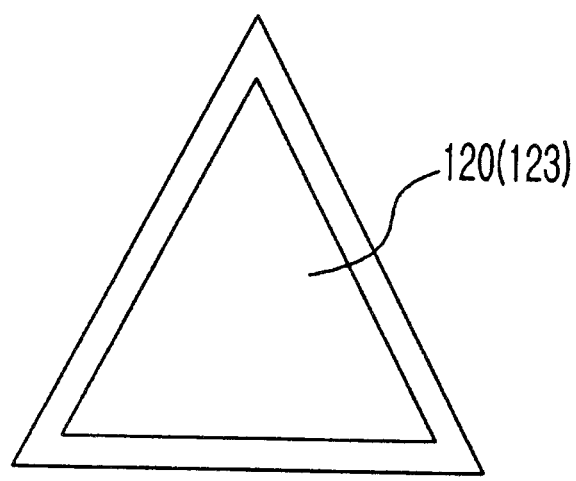

FIGS. 3A to 3D are from views showing a configuration of a focus control lens in a pair of golf eyeglasses having a function of correcting various swing errors and head-up movement, according to an embodiment of the present invention. As shown in FIGS. 3A to 3D, the focus control lens 123 that is used in a pair of golf eyeglasses having a function of correcting various swing errors and head-up movement, according to an embodiment of the present invention, may be implemented into an aperture system lens that can control the amount of light that is another example different from the multi-colored lens. The focus control lens 123 that is implemented into the aperture system lens may be configured to have a number of lenses that are detached from and attached to the focus control lens body 120. FIG. 3A illustrates a multi-colored lens type, and FIGS. 3B to 3D show various types of aperture system lenses, in which only a size of the central diameter of each lens varies. The focus control lens 123 employing an aperture system changes the size of the field of view of the golf ball-coloured focus control circle 40 according to the central diameter of each lens, and the smaller the diameter of the lens center, the more concentration is required for superior golfers.

FIGS. 4A to 4E are diagrams showing the shapes of a focus control lens body in a pair of golf eyeglasses having a function of correcting various swing errors and head-up movement, according to an embodiment of the present invention. As shown in FIGS. 4A to 4E, the focus control lens body 120 that is used in a pair of golf eyeglasses having a function of correcting various swing errors and head-up movement, according to an embodiment of the present invention, may be formed to have one of a circular shape, an oval shape, and an angularly polygonal shape, in correspondence to that of the structure housing 110. The focus control lens 123 is formed in shape in correspondence to that of the focus control lens body 120. Here, the focus control lens 123 is preferably configured into the same shape in correspondence to that of the focus control lens body 120, but is not limited thereto, and may be configured to have lenses having different shapes from each other.

FIG. 5 is a diagram showing another example of the focus control lens body in a pair of golf eyeglasses having a function of correcting various swing errors and head-up movement, according to an embodiment of the present invention. As shown in FIG. 5, the focus control lens body 120 that is used in a pair of golf eyeglasses having a function of correcting various swing errors and head-up movement, according to an embodiment of the present invention, may be configured to further include a light-emitting diode (LED) light source 124 that emits light onto an outer diameter along which the focus control lens 123 is formed. The LED light source 124 may perform a laser pointer focus control function, and provide a shining light source to thereby prevent the focuses of the golfer's eyes from blurring due nerves, and lead to concentration of the eyes.

Figure 7A:
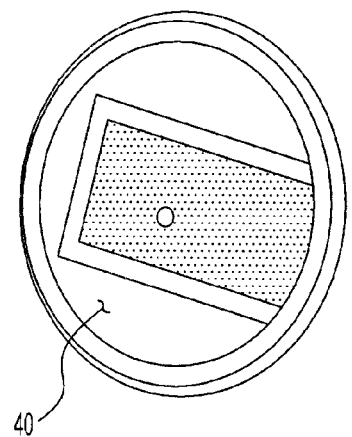
FIGS. 7A to 7C are diagrams respectively illustrating the field of views of a golf ball-coloured focus control circle of a golfer who wears a pair of golf eyeglasses having a function of correcting various swing errors and head-up movement, according to an embodiment of the present invention.
Figure 7B:
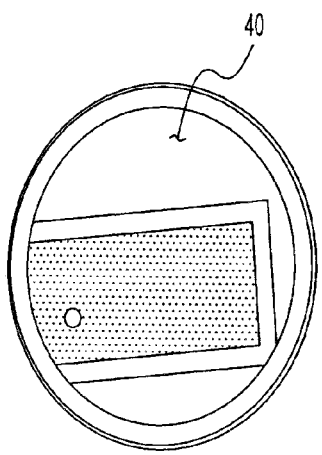
Figure 7C:
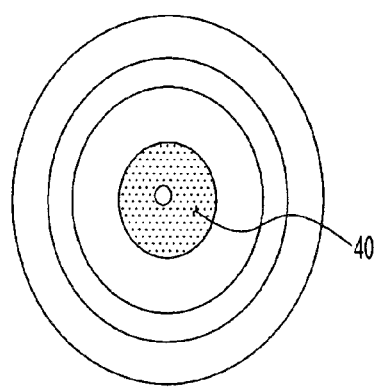

FIGS. 6A and 6B are views illustrating the states of wearing a pair of golf eyeglasses having a function of correcting various swing errors and head-up movement, according to an embodiment of the present invention, and FIGS. 7A to 7C are diagrams respectively illustrating the field of views of a golf ball-coloured focus control circle 40 of a golfer who wears a pair of golf eyeglasses having a function of correcting various swing errors and head-up movement, according to an embodiment of the present invention.

FIGS. 6A and 6B are a side view and a front view of a golfer who wears a pair of golf eyeglasses having a function of correcting various swing errors and head-up movement, including a golf ball-coloured focus structure 100 according to an embodiment of the present invention, respectively.

FIG. 7A illustrates that the golf ball-coloured focus control circle 40 of a golfer who wears a pair of golf eyeglasses having a function of correcting various swing errors and head-up movement, deviates partially from the center.

FIG. 7B illustrates that the golf ball-coloured focus control circle 40 of a golfer who wears a pair of golf eyeglasses having a function of correcting various swing errors and head-up movement, deviates a lot from the center to the right side.

FIG. 7C illustrates that the golf ball-coloured focus control circle 40 of a golfer who wears a pair of golf eyeglasses having a function of correcting various swing errors and head-up movement, is located at the center. In other words, when a golf swing practice is made at a state where a target golf ball to be swung to practice is positioned at the center of the golf ball-coloured focus control circle 40, the golf swing practice is made so that the state where a target golf ball to be swung to practice is positioned at the center of the golf ball-coloured focus control circle 40 is not made to change during making the golf swing practice, thereby correcting various swing errors and head-up movement that occur most frequently to golfers, maintaining consistency and improving golfer's concentration. In the case of a pair of golf eyeglasses having a function of correcting various swing errors and head-up movement, according to an embodiment of the present invention, one eyeglass lens 30 where the golf ball-coloured focus structure 100 is not provided and the other eyeglass lens 30 where the golf ball-coloured focus structure 100 is provided may be provided in the frame 10 of the eyeglasses. One of the eyeglass lenses may be formed of an eyeglass lens suitable for the user's eyes strength. Otherwise, one of the eyeglass lenses may be formed of an eyeglass lens which is not configured for the user's eye strength, or may be excluded from a configuration of the golf eyeglasses.

As described above, a pair of golf eyeglasses having a function of correcting various swing errors and head-up movement, according to an embodiment of the present invention enables a golfer to make a golf swing practice by using a limited field of view of a golf ball-coloured focus control circle, to thereby prevent side effects of nervous movement due to peripheral vision during a golf swing practice, and enabling golfers to make a golf swing practice with a high degree of concentration, and thus maintaining consistency of a golf swing operation in order to assist golfers in making a strong impact and help to increase the flight distance.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

[Industrial Applicability]

As described above, the pair of golf eyeglasses having a function of correcting various swing errors and head-up movement according to an embodiment of the present invention may be applied to the golf industry.

The invention claimed is:

1. A pair of golf eyeglasses having a function of correcting various swing errors and head-up movement, the golf eyeglasses comprising:
a golf color focus structure (100) that is mounted on at least one of left and right eyeglasses in a frame (10) of the eyeglasses, and that forms a golf color focus control circle (40) so as to make a golfer recognize the various swing errors and head-up movement that are caused by unstable posture occurring according to movement of the head, the eyes and the body of the golfer who makes a golf swing practice,
wherein the golf color focus structure (100) comprises:
a structure housing (110) having a hollow outer chamber (111) whose front and rear surfaces are opened, and a hollow inner chamber (112) that is mounted in the inside of the outer chamber (111): and
a focus control lens body (120) that is detachably fitted on the front surface of the structure housing (110), wherein the golf focus color structure (100) moves vertically and horizontally in the range of 360° at a portion connected with the frame (10) of the eyeglasses.

2. The pair of golf eyeglasses according to claim 1, wherein the golf focus color structure (100) further comprises an eyeglass connector (113) that is detachably connected with a connection member that is formed on any one of the left and right eyeglasses in the frame (10) of the eyeglasses, and
wherein a dual lens including a lens (30), and a blind lens (31) that covers the lens (30) and may be opened and closed is provided at any one of the left and right eyeglasses in the frame (10) of the eyeglasses with which the golf focus color structure (100) is not connected.

3. The pair of golf eyeglasses according to claim 1, wherein the structure housing (110) is configured so that the inner chamber (112) that is mounted in the inside of the outer chamber (111) is withdrawn toward the front side, and
wherein the focus control lens body (120) is linked at a state of being connected with the inner chamber (112) according to the frontward withdrawal of the inner chamber (111) and is thus withdrawn toward the front side.

4. The pair of golf eyeglasses according to claim 1, wherein the focus control lens body (120) comprises:
a lens body housing (122) having a structure connector (121) that is detachably connected on the front surface of the structure housing (110); and a focus control lens (123) that is mounted on the front surface of the lens body housing (122) to thus form the golf color focus control circle (40), and wherein the focus control lens (123) comprises a multi-colored lens having one or more colors toward a radial edge from the center of the diameter the lens.

5. A pair of golf eyeglasses having a function of correcting various swing errors and head-up movement, the golf eyeglasses comprising:

a golf color focus structure (100) that is mounted on at least one of left and right eyeglasses in a frame (10) of the eyeglasses. and that forms a golf color focus control circle (40) so as to make a golfer recognize the various swing errors and head-up movement that are caused by unstable posture occurring according to movement of the head, the eyes and the body of the golfer who makes a golf swing practice.

wherein the golf color focus structure (100) comprises:

a structure housing (110) having a hollow outer chamber (111) whose front and rear surfaces are opened, and a hollow inner chamber (112) that is mounted in the inside of the outer chamber (111); and a focus control lens body (120) that is detachably fitted on the front surface of the structure housing (110), wherein the golf focus color structure (100) further comprises an eyeglass connector (113) that is detachably connected with a connection member that is formed on any one of the left and right eyeglasses in the frame (10) of the eyeglasses, and wherein a dual lens including a lens (30), and a blind lens (31) that covers the lens (30) and may be opened and closed is provided at any one of the left and right eyeglasses in the frame (10) of the eyeglasses with which the golf focus color structure (100) is not connected.

6. The pair of golf eyeglasses according to claim 5, wherein the eyeglass connector (113) is prepared to employ any one of an adhesive Velcro® fastening method, a screw fastening method, and an interference fit method, in correspondence to a connection member of the frame (10) of the eyeglasses.

7. A pair of golf eyeglasses having a function of correcting various swing errors and head-up movement, the golf eyeglasses comprising:

a golf color focus structure (100) that is mounted on at least one of left and right eyeglasses in a frame (10) of the eyeglasses, and that forms a golf color focus control circle (40) so as to make a golfer recognize the various swing errors and head-up movement that are caused by unstable posture occurring according to movement of the head, the eyes and the body of the golfer who makes a golf swing practice, wherein the golf color focus structure (100) comprises:

a structure housing (110) having a hollow outer chamber (111) whose front and rear surfaces are opened, and a hollow inner chamber (112) that is mounted in the inside of the outer chamber (111); and a focus control lens body 20) that is detachably fitted on the front surface of the structure housing (110), wherein the focus control lens body (120) comprises:

a lens body housing (122) having a structure connector (121) that is detachably connected on the front surface of the structure housing (110): and a focus control lens (123) that is mounted on the front surface of the lens body housing (122) to thus form the golf color focus control circle (40), wherein the focus control lens (123) comprises a multi-colored lens having one or more colors toward a radial edge from the center of the diameter the lens, wherein the focus control lens body (120) further comprises a light emitting diode (LED) light source (124) that emits light onto the outer diameter along which the focus control lens (123) is formed.

\* \* \* \* \*